United States Patent [19]

Sakata

[11] Patent Number: 5,075,713

[45] Date of Patent: Dec. 24, 1991

[54] FOCUS CONTROL SYSTEM FOR CAMERA DEVICE

[75] Inventor: Masayuki Sakata, Tokyo, Japan

[73] Assignee: U.S. Philips Corp., New York, N.Y.

[21] Appl. No.: 643,868

[22] Filed: Jan. 18, 1991

[30] Foreign Application Priority Data

Jan. 19, 1990 [JP] Japan .................................. 2-10288

[51] Int. Cl.⁵ .............................................. G03B 3/10
[52] U.S. Cl. .............................. 354/400; 354/195.12; 358/227
[58] Field of Search ............ 354/400, 402, 286, 195.1, 354/195.12; 358/227; 352/252

[56] References Cited

U.S. PATENT DOCUMENTS 4,748,509 5/1988 Otake et al. ..................... 354/400

Primary Examiner—W. B. Perkey
Assistant Examiner—Cassandra C. Spyrou
Attorney, Agent, or Firm—William L. Botjer

[57] ABSTRACT

A focus control system for a camera is described having the possibilities of automatic and manual control, wherein a front lens group and a master lens group are movable. By moving the master lens group both in the automatic control mode and in one of the two manipulation ranges of the manual control mode focus control over a broad range is possible. Thereby maintaining a natured feeling for the user.

7 Claims, 2 Drawing Sheets

| CONTROL MODE | LENS GROUP | DISTANCE-TO-SUBJECT ∞ ----- ≈1.2m ----- ≈0.3m ----- ≈0.02m | | |
|---|---|---|---|---|
| AUTOMATIC | FRONT (11) | LENS RING 30 IS SET TO AUTO-MODE POSITION | LENS RING 30 IS SET TO AUTO-MODE POSITION | LENS RING 30 IS SET TO AUTO-MODE POSITION |
| AUTOMATIC | ZOOM (12) | MOVED BY MANIPULATION OF SWITCHES 52 AND 53 | MOVED FROM TELE-SIDE TO WIDE-SIDE BY OUTPUT FROM AF18 AS DISTANCE-TO-SUBJECT DECREASES | HELD AT WIDE END BY OUTPUT FROM AF18 |
| AUTOMATIC | MASTER (13) | MOVED TO OPTIMUM POSITION BASED ON OUTPUT OF AF18 AND POSITION INFORMATION OF VARIATOR LENS 12a | | |
| MANUAL | FRONT (11) | LENS RING 30 IS MANIPULATED | MECHANICALLY HELD AT POSITION CORRESPONDING TO DISTANCE-TO-SUBJECT OF 1.2m | MECHANICALLY HELD AT POSITION CORRESPONDING TO DISTANCE-TO-SUBJECT OF 1.2m |
| MANUAL | ZOOM (12) | MOVED BY MANIPULATION OF SWITCHES 52 AND 53 | MOVED FROM TELE-SIDE TO WIDE-SIDE BASE ON OUTPUT OF POTENTIOMETER 36 AS DISTANCE-TO-SUBJECT DECREASES | HELD AT WIDE-END BASED ON OUTPUT OF POTENTIO-METER 36 |
| MANUAL | MASTER (13) | HELD AT PREDETERMINED POSITION | HELD AT PREDETERMINED POSITION | MOVED BASED ON OUTPUT OF POTENTIOMETER 36 |

FIG. 3

FOCUS CONTROL SYSTEM FOR CAMERA DEVICE

BACKGROUND OF THE INVENTION

This invention relates generally to focus control systems for use in cameras, video cameras and the like and more particularly to such a focus control system by which an automatic focus control or a manual control can selectively be effected.

Portable video camera devices in the recent years are normally provided with an automatic focus control function and a manual focus control function so that the user can selectively use the two functions at his wish. The focus control systems for such camera devices with the two functions are generally classified into the following two types. The first type is constructed such that a front lens group is driven by an output from an automatic focus control circuit while it can also be moved by a manual operation. In the second type, the focus control is effected by moving a master lens group which is disposed rearwardly of a zoom lens group.

A focus control system of the aforesaid first type is advantageous in that the focused state obtained by the front lens group is not affected when the zoom lens group behind the front lens group is moved to change the magnification factor, but has the problem that it is not possible to focus on a subject located very closely to the camera device body. A focus control system of the second type is advantageous in that it is possible to focus on a subject located up to very near (for example, 0.02 m before) the camera body, but is disadvantageous in the following. When the zoom lens group is moved, the master lens group must also be moved to compensate for the change of the focusing condition accompanied by the movement of the zoom lens group. In addition, since a very small movement of the master lens group brings about a significant change in the focusing condition, it is extremely difficult to manually operate the master lens group. In the manual mode of operation of the conventional focus control system of this type, the position of the master lens group is therefore electrically controlled within a movable range thereof based on an output from a variable resistor, a switch or the like which is manually operated, so that a virtual manual operation is performed. However, such a virtual manual operation is not natural for the user as compared to an actual manual operation.

SUMMARY OF THE INVENTION

It is therefore an object of the invention to provide a focus control system which has the advantages of the conventional focus control devices of the aforesaid two types, and is yet simple in structure without the need for a complicated control.

According to the present invention, the focus control system is characterized in that it comprises manipulation means coupled to a front lens group for moving the front lens group in the direction of an axis thereof when manipulated within a first manipulation range and for holding the front lens group at a predetermined position when manipulated within a second manipulation range; a signal generator coupled to the manipulation means for generating a signal corresponding to a manipulation of the manipulation means at least within said second manipulation range; a master lens group disposed rearwardly of the front lens group so as to be movable in the direction of an axis thereof; an image sensor for converting optical information of an object fed through the front and master lens groups into an electric signal; an automatic focus control circuit for determining whether the object is in a focused state or not based on the electric signal; a switch for selecting an automatic focus control mode (an automatic mode) or a manual focus control mode (manual mode); and a drive control unit for moving the master lens group in accordance with an output of the automatic focus control circuit so that the object is brought into a focused state when the automatic mode is selected by the switch and for moving the master lens group in accordance with an output of the signal generator when the manipulation means is manipulated within the second manipulation range and when the manual mode is selected by the switch.

With this construction, the position of the master lens group is controlled in accordance with the output of the automatic focus control circuit in the automatic mode so that a focused state is automatically obtained. In the manual mode, the front lens group is mechanically moved by the manipulation means within the first manipulation range to change the focusing, while within the second manipulation range the front lens group is moved by the output of the signal generator, which varies in response to the manipulation of the manipulation means, to change the focusing. Thus, the user can perform the focusing operation over a significantly broad distance-to-object range with less unnatural feeling even in the manual mode. Also, the structure is simple since the front lens group need not be electrically controlled. In addition, the position control of the master lens group by the drive control unit in the manual mode is made in response to the output of the signal generator and is therefore simple.

If the aforesaid switch is so arranged as to be automatically actuated when the manipulation means are adjusted to a predetermined position which is not included in the first nor second manipulation range, the focus control system cannot only automatically be brought into the automatic mode by simply adjusting the manipulation means to this predetermined position but also can automatically be brought into the manual mode by further operating the manipulation means, thus providing the user with a good operability and a convenient use. In this case, the manipulation means may be constructed by a lens ring which is rotatably supported by the camera device and to which the front lens group is coupled so as to be movable along its axis in conjunction with the lens ring, and the switch may be so arranged as to be actuated when this lens ring is adjusted to a predetermined rotational position. The signal generator may be a potentiometer operatively coupled to the lens ring. It is also preferably to provide, between the lens ring and the front lens group, a guiding mechanism which covnets a rotational movement of he lens ring into an axial movement o the front lens group when the lens ring is rotated within the first manipulation range and maintains an axial position of the front lens group when the lens ring is rotated with in the second manipulation range.

In the case where a zoom lens group is provided between the front lens group and the master lens group, the system may comprise a position detector for converting an axial position of he zoom lens group into an electric signal, and the drive control unit may further control the axial position of the zoom lens group based on the output of the automatic focus control circuit if the automatic focus control mode is selected by the switch. In this case, the drive control unit also holds the master lens group at a predetermined axial position and moves the zoom lens group in its axial direction based on the output of the signal generator if the manipulation means are located in a third manipulation range within eh second manipulation range at the time when the manual focus control mode is selected by the switch, whereas the drive control unit holds the zoom lens group at a predetermined axial position and moves the master lens group in its axial direction in accordance with the output of the signal generator when the manipulation means are located in a fourth range within the second manipulation range.

BRIEF DESCRIPTION OF THE DRAWING

Embodiments of the present invention will now be described in detail with reference to the drawings wherein

FIG. 3 is a chart for explaining the operation of the embodiment of FIG. 1; and

DETAILED DESCRIPTION OF THE PREFERRED EMBODIMENTS

Figure 1:
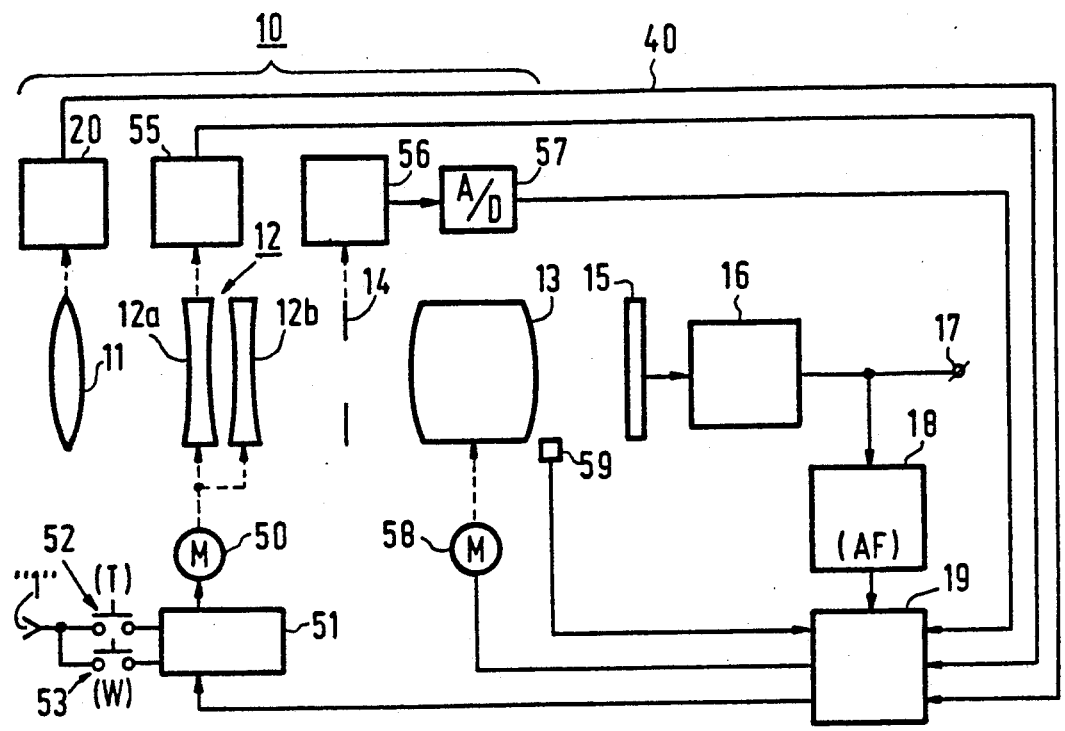
FIG. 1 is a block diagram showing a structure of a focus control system according to one embodiment of the invention for a camera device.

In FIG. 1, 10 is a camera lens group for a video camera. The camera lens group 10 comprises a front lens group 11 disposed nearest to a subject, a zoom lens group 12 including a variator lens group 12a and a compensation lens group 12b both disposed behind the front lens group 11, a master lens group 13 disposed behind the zoom lens group 12, and an iris 14 disposed between the zoom lens group 12 and the master lens group 13. Each of the lens groups 11, 12a and 13 (and of the lens group 12b depending on the case) comprises a plurality of lenses in practice. The variator lens group 12a is mechanically coupled in the known manner to the compensation lens group 12b so that the two lens groups are mutually movable with a certain relation along an axis. Disposed behind the master lens group 13 is an image sensor 15, for example a CCD. The image sensor 15 converts an optical image formed on this sensor via the camera lens group 10 to an electric signal corresponding to the image. Output electric signals from the image sensor 15 are sampled by a correlated-double-sampling circuit 16 and supplied to a terminal 17, from which the signals are supplied to various portions in this video camera. A part of the output of the correlated-double-sampling circuit 16 is supplied to an automatic focus (AF) control circuit 18, which forms a data signal representing information of whether the subject is in a focused state and supplies this data signal to a microcomputer 19. The microcomputer 19 includes therein programs necessary for carrying out a focus control and the like to be made by this focus control system.

The front lens group 11 is coupled to a position encoder 20. The position encoder 20 supplies to the microcomputer 19 a signal indicating whether this focus control system is in an automatic mode or in a manual mode and a data signal representing the variation in focusing in accordance with a manual operation of the front lens group 11.

Figures 2, 4:
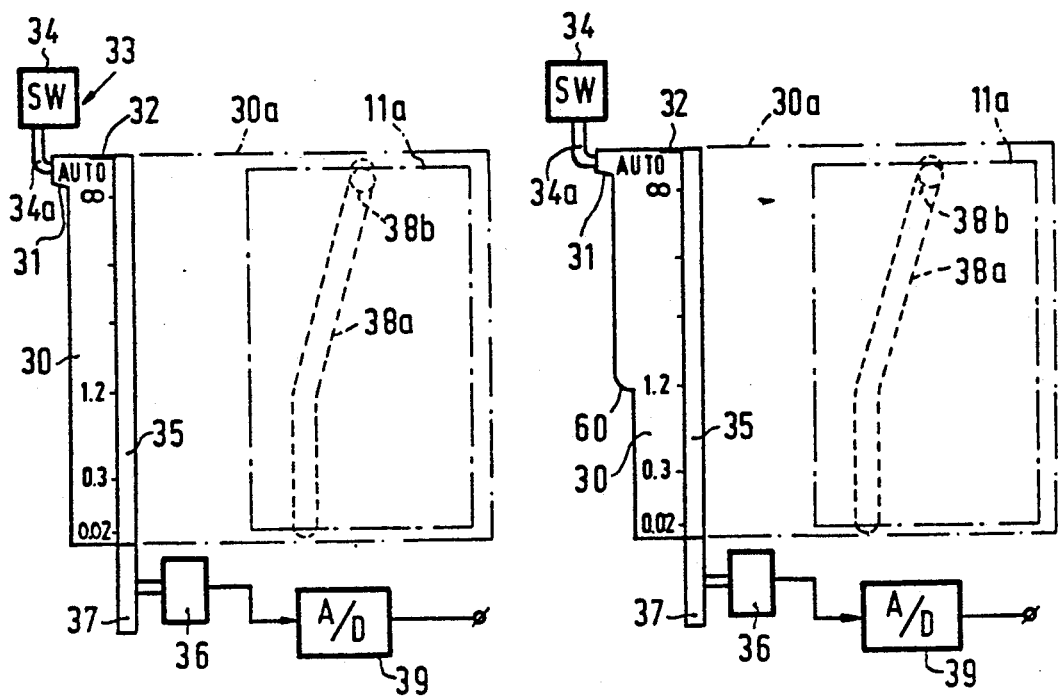
FIG. 2 is a diagrammatic illustration of one example of the position encoder 20 in the embodiment of FIG. 1.
FIG. 4 is an illustration showing a modification of the position encoder 20 of FIG. 2.

FIG. 2 diagrammatically illustrates a structure of the position encoder 20 wherein a side view of a part of mechanism of the front lens group 11 is shown. In FIG. 2, shown at 30 is a manipulation ring (hereinafter referred to as "lens ring") for the front lens group 11. The lens ring 30 is rotatably supported by a body of this video camera via a cylindrical portion 30a of the ring. A cylindrical lens frame 11a of the front lens group 11 is provided within the cylindrical portion 30a so as to be movable along an axis thereof. An outer peripheral surface of the lens ring 30 is provided at its front end portion with indications of distance-to-subject (for example, "∞"... "1.2 m"... 0.3 m"... "0.02 m") which are arranged along the periphery of the lens ring. The lens ring 30 is also provided on its front end face with a projection 31 which is disposed out of the range of the indications of distance-to-subject but in the vicinity of the indication of "∞". The lens ring 30 is further provided on the outer peripheral surface thereof with an alignment mark 32 at a position corresponding to the projection 31 and with an indication of "AUTO" which shows that the position of the mark corresponds to a position at which the automatic mode is selected. A switch 34 is fixedly mounted on the body of this video camera at its reference position 33 with regard to rotational positions of the lens ring 30. When the alignment mark 32 on the lens ring 30 is brought into agreement with the reference position 33, that is to say when the projection 31 comes to a position corresponding to the switch 34 in this embodiment, an actuation lever 34a of the switch 34 is pushed whereby the switch 34 is operated. Teeth of a gear 35 are formed in the lens ring 30 along the entire periphery thereof. The gear 35 is meshed with another gear 37 which is mounted on a shaft of a potentiometer 36 mounted on the body of this video camera. Thus, when the lens ring 30 is manually rotated, the resistance value of the potentiometer 36 varies accordingly. The cylindrical portion 30a of the lens ring 30 is formed in an inner peripheral surface thereof with a guide groove 38a, while the cylindrical lens frame 11a is provided with a guide pin 38b which projects over an outer peripheral surface of the frame 11a so as to engage with the guide groove 38a. The guide groove 38a has such a shape that the rotation of the lens ring 30 is limited to within a range between the mark 32 and the indication of "0.02 m" with respect to the reference position 33, and that the lens frame 11a (or the front lens group 11) does not move in its axial direction when the lens ring 30 is rotated within the range between the mark 32 and the indication of "∞". The guide groove 38a has also such a shape that when the lens ring 30 is rotated from the indication of "∞" to the indication of "1.2 m" the front lens group 11 moves forward along its axis by an amount corresponding to the rotation angle of the lens ring 30, and that the front lens group 11 does not move in its axial direction when the lens ring 30 is rotated within a range between the indications of "1.2 m" and "0.02 m".

The resistance value of the potentiometer 36 is converted by an analog-to-digital converter 39 to a digital signal. An output signal of the analog-to-digital converter 39 and an output signal of the switch 34 are supplied through signal lines 40 shown in FIG. to the microcomputer 19.

The variator lens group 12a of the zoom lens group 12 can be moved in its axial direction by driving a motor 50 coupled to this lens group. A drive circuit 51 for the motor 50 is supplied with a drive command signal from the microcomputer 19 and with output signals respectively of a switch 52 for telephoto (T) and a switch 53 for wide-angle (W) both mounted on an operation manipulation section of this video camera. Thus, the variator lens group 12a cannot only be moved back and forth in accordance With the output signal from the microcomputer 19 but also be moved in a direction desired by the user in accordance with the manipulation of the switches 52 and 53. The axial position of the variator lens group 12a is detected, for example, by a known position encoder 55 such as a rotary encoder and supplied to the microcomputer 19. The iris 14 is coupled to a position detector 56 such as a Hall device for detecting the iris amount. A position signal produced by the position detector 56 is supplied through an analog-to-digital converter 57 to the microcomputer 19.

The master lens group 13 is driven, for example, by a stepping motor 58 so that it moves back and forth along an axis thereof within a predetermined range. A sensor 59 is provided in the vicinity of the master lens group 13 for detecting a state in which this master lens group is located at one terminal end of the above range, an output of which sensor is supplied to the microcomputer 19. Thus, the microcomputer 19 scan sense, based on the output of the sensor 59, that the master lens group 13 is located at a reference position and can also detect the current position of the maser lens group 13 based on the number of the pulses which it supplies to the motor 58.

The operation of the focus control system having the above structure will now be described with reference to FIG. 3.

First, the operation in the automatic mode will be described, When it is desired to put the focus control system of this video camera int eh automatic mode, the user rotates the lens ring 30 to bring the mark 32 into agreement with the reference position 33. The micrometer 19 senses this mode a the hand of the output of the switch 34. Thus, in the automatic mode, the axial position of the front lens group 11 is kept in the state in which the lens ring 30 is st to the automatic-mode position (that is to say, the state in which the front lens group is positioned at its rear end).

In this automatic mode, for a subject within the range between the infinite and 1.2 m the microcomputer 19 drives, in accordance with the output data of he automatic focus control circuit (AF) 18 and the position information of the variator lens group 12a fed for the position encoder 55, the stepping motor 58 to thereby move the master lens group 13 so that an optimum focused-state is obtained. In this mode, the user can obtain a desired multiplication factor by manipulating the switches 52 and 53 to thereby move the zoom lens group 12.

For subject located between 1.2 m and 0.3 m, the microcomputer 19 drives the motor 50 through he drive circuit 51 to thereby move the zoom lens group 12 and also drives the stepping motor 58 to thereby move the master lens group 13, in accordance with the output data of the auto-focus control circuit (AF) 18 and the position information of the variator lens group 12a fed from the position encoder 55, so that an optimum focused-state is obtained. In this case, the zoom lens group 12 is controlled so as to move from the tele-photo side to the wide-angle side as the distance-to-subject decreases.

For a subject located in the range between 0.3 m and 0.02 m, the microcomputer 19 holds the zoom lens group 12 at the wide-angle end and also drives the stepping motor 58 to thereby move the master lens group 13, in accordance with the output of the auto-focus control circuit (AF) 18 and the position information of the variator lens group 12a fed from the position encoder 55, so that an optimum focused-state is obtained.

Thus, in this automatic mode a subject located in the range between the infinite and 0.02 m can be automatically focused on while any magnification factor can be set for a subject located between the infinite and 1.2 m by manipulating the switches 52 and 53.

Next, the operation in the manual mode will be described.

When it is desired to put the focus control system in the manual mode, the user simply rotates the lens ring 30 so that a desired focal distance is obtained. In this case, since the lens ring 30 is located at any rotational position within the range in which the reference position 33 is situated between the indication positions of "∞"and "0.02 m", the switch 34 is in a non-actuated state. The microcomputer 19 reads this non-actuated state of the switch 34 and determines that the focus control device is in the manual mode.

In this manual mode, when the user rotates the lens ring 30 within the range between the indication positions of "∞"and "1.2 m" for a subject located in the range between the infinite and 1.2 m, the front lens group 11 moves back and forth in accordance with the rotation of the lens ring 30 whereby a focused state of the subject can be obtained. In this case, the microcomputer 19 detects in accordance with the resistance value of the potentiometer 36 the fact that the distance-to-subject is within the above range and holds the master lens group 13 at a predetermined position. The user can also manipulate the switches 52 and 53 to move the variator lens group 12a to thereby obtain a desired magnification factor within this range of distance-to-subject. As described earlier, this movement of the zoom lens group 12 does not affect the focused state obtained by the front lens group 11.

The user can obtain the focused state of a subject located between 1.2 m and 0.3 m by rotating the lens ring 30 within the range between the indication positions of "1.2 m" and "0.3 m". In this case the front lens group 11 is mechanically held in the axial direction at the position corresponding to the distance-to-subject of 1.2 m (refer to the shape of the guide groove 38a shown in FIG. 2). The microcomputer 19 detects in accordance with the resistance value of the potentiometer 36 the fact that the subject is located within the above range and holds the master lens group 13 at the aforesaid predetermined position. At the same time, the microcomputer 19 drives the motor 50 to move the zoom lens group 12 in accordance with the resistance value of the potentiometer 36 and the output of the position encoder 55. In this case, the zoom lens group 12 is controlled in such a manner that it moves from the telephoto side to the wide-angle side as the lens ring 30 is rotated in the direction from the indication position of "1.2 m" towards the indication position of "0.3 m". Thus, within this range of distance-to-subject the focus adjustment is performed only by the movement of the zoom lens group 12 in accordance with the rotation of the lens ring 30, and the front lens group 11 and the master lens group 13 are not moved.

The user can obtain the focused state of a subject located between 0.3 m and 0.02 m by rotating the lens ring 30 within the range between the indication positions of "0.3 m" and "0.02 m". In this case, the front lens group 11 is also mechanically held in the axial direction at the position corresponding to the distance-to-subject of 1.2 m as described above for the case of the range of distance-to-subject between 1.2 m and 0.3 m. The microcomputer 19 detects in accordance with the resistance value of the potentiometer 36 the fact that the distance-to-subject is within the range between 0.3 m and 0.02 m, and holds the zoom lens group 12 at the wideangle end. At the same time, the microcomputer 19 moves the master lens group 13 from the aforesaid predetermined position by an amount determined by the resistance value of the potentiometer 36 to thereby change the focusing. Thus, within this range of distance-to-subject the focus adjustment is performed only by the movement of the master lens group 13 in accordance with the rotation of the lens ring 30.

In the above embodiment, the change of control in the manual mode at 1.2 m is performed based on the resistance value of the potentiometer 36. In an alternative way, however, a step 60 may be provided on the lens ring 30 at a position corresponding to the distance-to-subject of 1.2 m as shown in FIG. 4 so that the step can be detected by a switch 34'. The switch 34' should be different from the switch 34 of FIG. 2 in that an actuation member 34a thereof has two operating positions at which it outputs corresponding signals, respectively.

In the embodiment described above, although the axial holding position of the front lens group in the automatic mode is set to a position which corresponds to the infinite, the position of the front lens group may theoretically be any position within the range of its axial movement provided that it is held stationary at that position. Also, although the switch 34 is so arranged as to automatically be actuated when the lens ring is adjusted to the predetermined position, the switch for the selection of the automatic mode and the manual mode may be provided independently of the lens ring. With this structure, however, when selecting the automatic mode the user must perform an additional operation to adjust the front lens group to the predetermined position.

In the described embodiment, the lens ring 30 and the front lens group 11 are coupled to each other through the guiding groove 38a and the pin 38b so that the front lens group is moved back and forth in accordance with the rotation of the lens ring. However, the coupling of the lens ring to the front lens group should not be restricted to this structure but can be made in other various ways. For example, the coupling may alternatively be made such that the front lens group moves back and forth rotating about its axis in accordance with the rotation of the lens ring. Also, the manipulation member for the movement of the front lens group should not be restricted to a lens ring but may alternatively have any structure which causes the front lens group to move in accordance with the manipulation thereof.

With this invention, in the automatic mode the position of the master lens group is controlled in response to the output of the automatic focus control circuit so that the focused state is automatically obtained. In the manual mode, the front lens group is mechanically moved by the manual rotation of the lens ring within the manipulation range corresponding to the longer distances-to-subject to change the focusing condition, while within the manipulation range corresponding to the shorter distances-to-subject the master lens group is moved in accordance with the output o the potentiometer, which is varied in response to eh rotation of the lens ring, to change the focusing conditions, It is therefore possible for the user to perform the focusing operation over the significantly broader range of distance-to-subject with less unnatural feeling. In addition, the system is simple in structure since an electric control of the front lens is not necessary. Furthermore, the position control of the master lens group is carried out based on the output of the potentiometer and can therefore be simple.

I claim:
1. A focus control system for a camera device characterized in that it comprises;
   manipulation means coupled to a front lens group for moving said front lens group in the direction of an axis thereof when manipulated within a first manipulation range and for holding said front lens group at a predetermined position when manipulated within a second manipulation range;
   a signal generator coupled to said manipulation means for generating a signal corresponding to a manipulation of said manipulation means at least within said second manipulation range;
   a master lens group disposed rearwardly of said front lens group so as to be movable in the direction of an axis thereof;
   an image sensor for converting optical information of an object fed through said front and master lens groups into an electric signal;
   an automatic focus control circuit for determining whether said object is in a focused state or not based on said electric signal;
   a switch for selecting an automatic focus control mode or a manual focus control mode; and
   a drive control unit for moving said master lens group in accordance with an output of said automatic focus control circuit so that said object is brought into a focused state when said automatic focus control mode is selected by said switch and for moving said master lens group in accordance with an output of said signal generator when said manipulation means are manipulated within said second manipulation range and when said manual focus control mode is selected by said switch.

2. A focus control system for a camera device according to claim 1, characterized in that said switch is coupled to said manipulation means so as to be actuated when said manipulation means is set to a predetermined position which is not included in aid first manipulation rane nor in said second manipulation range.

3. A focus control system for a camera device according to claim 2, characterized in that said manipulation means are a lens ring which is rotatably supported by said camera device and to which said front lens group is coupled so as to be movable in its axial direction in conjunction with said lens ring, said switch being arranged so as to be actuated when said lens ring is at a predetermined rotational position.

4. A focus control system for a camera device according to claim 3, characterized in that said signal generator comprises a potentiometer which is operatively coupled to said lens ring.

5. A focus control system for a camera device according to claim 3 characterized in that between said lens ring and said front lens group there is provided a guiding mechanism which cornets a rotation a movement of said lens ring into an axial movement of said front lens group when said lens ring is rotated within said first manipulation range and maintains an axial position of said front lens group when said lens ring is rotated within said second manipulation range.

6. A focus control system for a camera device according to claim 1 characterized by further comprising a zoom lens group disposed between said front lens group and said master lens group and a position detector for converting an axial position of said zoom lens group into an electric signal, said drive control unit further controlling the axial position of said zoom lens group based on the output of said automatic focus control circuit when said automatic focus control mode is selected by said switch, said drive control unit holding said master lens group at a predetermined axial position and moving said zoom lens group in its axial direction based on the output of said signal generator when said manipulation means are located in a third manipulation range within said second manipulation range in the case where said manual focus control mode is selected by said switch, said drive control unit holding said zoom lens group at a predetermined axial position and moving said master lens group in its axial direction in accordance with the output of said signal generator when said manipulation means are located in a fourth range within said second manipulation range.

7. A focus control system for a camera device according to claim 6, characterized in that said predetermined axial position, at which said zoom lens group is held when said manual focus control mode is selected by said switch and when said manipulation means are located in said fourth range, is a terminal end on the wide side of the axial movement range of said zoom lens group.

* * * * *